No. 810,456. PATENTED JAN. 23, 1906.
C. E. ACKER.
PROCESS OF MAKING CHLORIN COMPOUNDS OF TIN.
APPLICATION FILED DEC. 30, 1903. RENEWED JUNE 14, 1905.
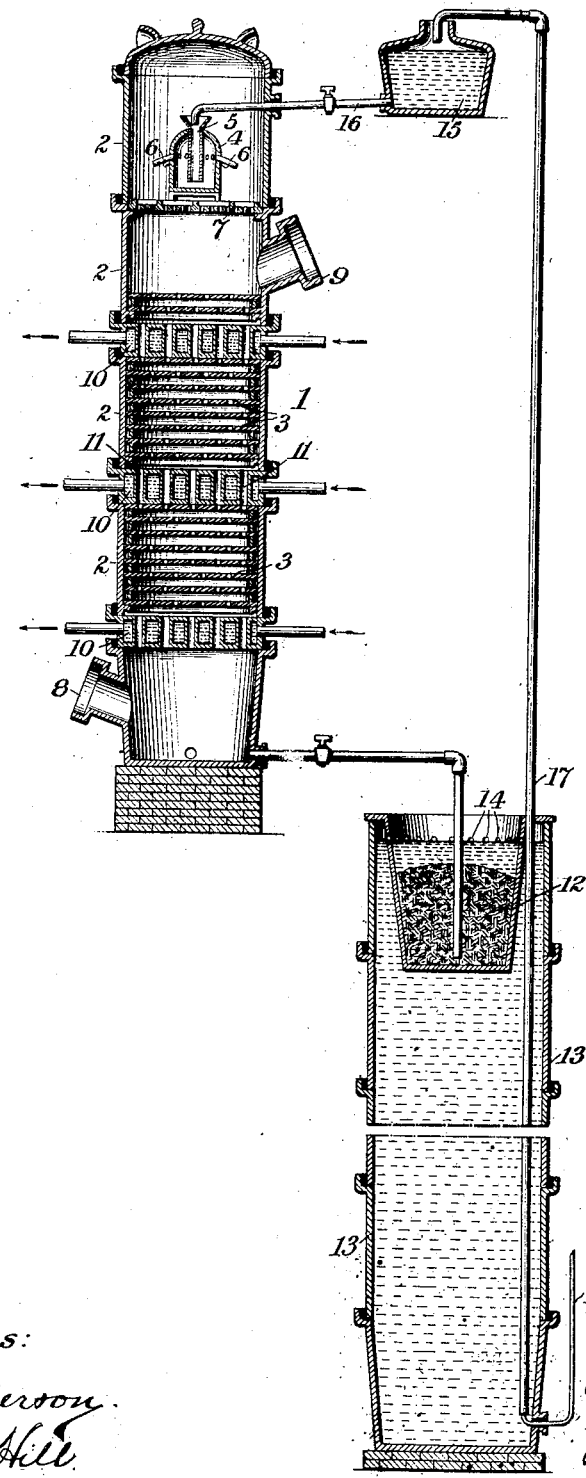
Witnesses:
R A Balderson
J. B. Hill
Inventor:
Charles E. Acker
by
Byrnes Townsend,
Attys.

UNITED STATES PATENT OFFICE.

CHARLES E. ACKER, OF NIAGARA FALLS, NEW YORK, ASSIGNOR TO ACKER PROCESS COMPANY, A CORPORATION OF NEW JERSEY.

PROCESS OF MAKING CHLORIN COMPOUNDS OF TIN.

No. 810,456.  Specification of Letters Patent.  Patented Jan. 23, 1906.

Application filed December 30, 1903. Renewed June 14, 1905. Serial No. 265,239.

*To all whom it may concern:*

Be it known that I, CHARLES E. ACKER, a citizen of the United States, residing at Niagara Falls, in the county of Niagara and State of New York, have invented certain new and useful Improvements in Methods of Making Chlorin Compounds of Tin, of which the following is a specification.

This invention is a method of making chlorin compounds of tin.

Heretofore it has been customary to prepare stannic-chlorid solutions by reacting upon metallic tin with hydrochloric acid in solution, thereby forming stannous chlorid, and subsequently converting said stannous chlorid to stannic chlorid by addition of potassium chlorate to the acid solution. This process is relatively expensive, since the chlorin is derived from the comparatively costly compounds hydrochloric acid and potassium chlorate, and is furthermore subject to the disadvantages that the solutions produced cannot in practice exceed a density of 50° to 51° Baumé and are contaminated by the presence of considerable quantities of potassium chlorid derived from the reduction of the chlorate. Furthermore, it is impractical to concentrate such solutions by reason of the loss of stannic chlorid by volatilization and the tendency of the solutions to become basic. Solutions of a density of 60° Baumé have been prepared by first producing a solution of stannous chlorid, concentrating the same to saturation, and subsequently converting it, by means of potassium chlorate, to stannic chlorid; but this process is an expensive one, and the solutions obtained are also contaminated by potassium chlorid.

I have discovered that stannic-chlorid solutions of high concentration and uncontaminated by impurities of any kind may be produced by circulating a solvent containing chlorin successively and repeatedly in contact with metallic tin and in contact with a reagent capable of converting the tin in solution from the divalent to the tetravalent state and have claimed such process in my copending application, Serial No. 160,564, filed June 8, 1903. I have also discovered that if such stannic-chlorid solutions having a specific gravity equal to or exceeding 1.80 be converted by contact with metallic tin to stannous-chlorid solutions of a corresponding concentration the stannous chlorid will separate from said solutions in the form of crystals of a high degree of purity. Such process I have claimed in my copending application, Serial No. 160,565, filed June 8, 1903.

In my copending application, Serial No. 160,566, filed June 8, 1903, I have described and claimed an apparatus suitable for carrying out either of the above-mentioned processes, said apparatus comprising, essentially, a dissolving vessel for metallic tin, a reaction tower or vessel in operative connection therewith, and a suitable source of chlorin or of chlorin and hydrochloric acid communicating with said reaction-tower.

I have now discovered that in order to secure the best results with the greatest economy of operation it is necessary to maintain such conditions as will prevent the substantial formation and accumulation in the solution of metastannic compounds. I have observed a strong heating effect due to the solution of the tin and a further strong heating effect due to its conversion from the divalent to the tetravalent state, the combined effect being sufficient to cause a rapid increase in the temperature of the circulating solution. I have found that such increase is accompanied by a tendency to the formation of metastannic compounds and that by operating under conditions as hereinafter stated any serious accumulation of such metastannic compounds in the solution may be avoided.

For a full understanding of my invention reference is made to the accompanying drawing, wherein one form of apparatus suitable for carrying my process into effect is shown in vertical section.

Referring to the figure, 1 represents a reaction-tower, which may be of any suitable type. It is here indicated as comprising a series of superposed stoneware sections 2, provided with perforated distributing-plates 3 and hereinafter referred to as "reaction-sections." In the uppermost section is a distributing device for the inflowing liquid, comprising a receiving vessel 4, an inlet-pipe 5, leading to a point near the bottom thereof, and a plurality of discharge orifices or tubes 6 6, the whole being supported by a distributing-plate 7.

8 9 represent, respectively, the inlet and outlet for chlorin or the gaseous mixture containing chlorin, hereinafter more fully described.

10 indicates cooling-sections of the tower interposed between the several reaction-sections 2. Said sections 10 are indicated as provided with means for causing water or other cooling medium to circulate between and around short vertical tubes 11, which communicate with upper and lower reaction-sections.

12 represents a dissolving-tank for metallic tin which may conveniently comprise a glazed-stoneware vessel supported at or near the top of a solution-tank 13 and provided near its top with a series of orifices 14. Means are provided, as shown, for conducting the solution from the reaction-tower to the dissolving-tank and, if desired, for distributing the solution therein.

15 represents an elevated receiving vessel to which the solution is raised by suitable means and from which it is permitted to return through pipe 16 to the reaction-tower. As one suitable means for raising the solution I have indicated an air-lift comprising a pipe 17, immersed to a suitable depth in the solution in tank 13, and an air-injection pipe 18 in operative relation therewith.

I have shown the dissolving-tank 12 as supported near the surface of the solution in 13. This possesses the special advantage that the rise of temperature of the liquid due to the solution of the tin is thereby minimized, the heat being rapidly dissipated. This is important for the avoidance of the formation of metastannic compounds, as will more clearly appear.

The construction and arrangement of the apparatus may be widely varied, it being essential only that effective means be provided for cooling the circulating solution. Instead of or in addition to the cooling-sections in the reaction-tower I may, for instance, cool the liquid at any part of the circuit, or a part or all of the necessary cooling may be accomplished by a sufficient reduction in the temperature of the reacting gas, or, if desired, the solution might be sufficiently cooled by exposing extended surfaces to the action of the atmosphere. This cooling effect is aided by the use of dilute chlorin, as hereinafter described.

My process depends upon the fact that certain tin salts in which the tin is in the tetravalent state are extremely energetic solvents for metallic tin, the metal passing into solution and the solvent liquid being reduced wholly or in part to the divalent state. The liquid having thus lost its solvent power for tin is thereupon brought into contact with chlorin gas, whereby it is again raised to the tetravalent state with corresponding restoration of its solvent power. This regenerated solvent is again brought into contact with metallic tin and again regenerated, the operation proceeding in this manner until the required concentration is reached, whereupon the stannic-chlorid solution is withdrawn from the system, an equivalent amount of water or a suitable chlorid solution being added, and the process continued as before. If desired, the process may be made continuous by the gradual withdrawal of the tin-chlorid solution and the addition of corresponding quantities of water or chlorid solution. To obtain the solution containing the tin in the tetravalent condition, it should be withdrawn from the system at a point immediately following the treatment with chlorin. If the liquid contains an excess of chlorin, said excess is removed by the careful addition of stannous chlorid, and a clear, pure, colorless, and dense solution is obtained. To obtain a solution containing the tin in the divalent condition, it may be withdrawn from the system at a point immediately following the treatment with metallic tin, or, if desired, the solution may be withdrawn as stannic chlorid, and subsequently subjected in a separate vessel to the action of metallic tin to convert it into stannous chlorid. From solutions so produced the stannous chlorid will separate in the form of crystals of a high degree of purity, and if the stannous-chlorid solution is formed at a temperature above the normal a large yield of the crystals will be obtained when the solution is permitted to cool.

The presence of metastannic salts is particularly injurious in the production of stannic chlorid. The stannic-chlorid solution produced as above described contains some free chlorin, and this is most conveniently removed by the careful addition, as above mentioned, of stannous chlorid. Under these conditions, however, a slight excess of stannous chlorid is often added, and such stannous salt in presence of a metastannic compound develops a yellow or brownish tint in the product.

The precise degree of temperature at which the circulating solution should be maintained is dependent to some extent upon the specific conditions of the operation—as, for instance, the concentration of the solution and the degree of dilution of the chlorin gas. Under the specific conditions above described I have found it advisable to maintain the solution between 40° and 60° centigrade.

I find that it is not necessary to use pure chlorin gas for the conversion of the tin from its divalent to its tetravalent state, but that the gas may contain a large proportion of air or oxygen. I have also found that the reaction is facilitated by the injection of steam into the chlorin, with the consequent formation of hydrochloric acid, or by the use of chlorin containing a certain proportion of hydrochloric acid.

I have employed a gaseous mixture containing ninety-five to ninety-six per cent. of air, four to five per cent. of chlorin, and a small percentage of hydrochloric acid. The use of dilute chlorin possesses the advantage that a portion of the heat evolved by the reaction is absorbed in raising the temperature of the large volume of gas so provided, it being possible therefore to utilize larger absolute quantities of chlorin in a given time. The addition of hydrochloric acid or the utilization of gases containing hydrochloric acid results in the acceleration of the solvent action of stannic chlorid upon metallic tin and serves also to prevent the formation of oxychlorids of tin.

A gas possessing the general characteristics above referred to is conveniently produced by the operation of my electrolytic cell substantially as described in my prior patent, No. 674,691, issued May 21, 1901. The conduit 8, above described as an inlet for the gas which serves to convert the tin from the divalent to the tetravalent state, may be therefore the outlet of the electrolytic cell in which chlorin is produced.

It will be obvious that the character of the original liquid which under the conditions of my process is to become a solution of stannic chlorid may be considerably varied. Thus water may be employed or any desired proportion of stannic chlorid, stannous chlorid, hydrochloric acid, or other suitable compound may be added thereto.

I claim—

1. The herein-described method of making chlorin compounds of tin, which consists in subjecting a solvent for tin to the alternate action of metallic tin and chlorin, and cooling the solution, whereby the tendency to produce metastannic compounds is avoided, substantially as described.

2. The herein-described method of making chlorin compounds of tin, which consists in subjecting a solvent for tin to the alternate and repeated action of metallic tin and chlorin, and cooling the solution, whereby the tendency to produce metastannic compounds is avoided, substantially as described.

3. The herein-described method of making chlorin compounds of tin, which consists in subjecting a solvent for tin to the alternate action of metallic tin and a gaseous mixture containing chlorin, and cooling the solution, whereby the tendency to produce metastannic compounds is avoided, substantially as described.

4. The herein-described method of making chlorin compounds of tin, which consists in subjecting a solvent for tin to the alternate and repeated action of metallic tin and a gaseous mixture containing chlorin, and cooling the solution, whereby the tendency to produce metastannic compounds is avoided, substantially as described.

5. The herein-described method of making chlorin compounds of tin, which consists in subjecting a solvent for tin to the alternate action of metallic tin and a gaseous body containing chlorin, and cooling the solution by a medium out of contact therewith, whereby the tendency to produce metastannic compounds is avoided, substantially as described.

6. The herein-described method of making chlorin compounds of tin, which consists in subjecting a solvent for tin to the alternate and repeated action of metallic tin and a gaseous body containing chlorin, and cooling the solution by a medium out of contact therewith, whereby the tendency to produce metastannic compounds is avoided, substantially as described.

In testimony whereof I affix my signature in presence of two witnesses.

CHARLES E. ACKER.

Witnesses:
CLARENCE B. McKENZIE,
GERALDINE M. McBRIDE.